United States Patent
Crawford et al.

(10) Patent No.: US 9,810,511 B1
(45) Date of Patent: Nov. 7, 2017

(54) LASER SPOT TRACKING RECEIVER

(71) Applicant: Analog Modules, Inc, Longwood, FL (US)

(72) Inventors: Ian Drummond Crawford, Longwood, FL (US); Noal Conan Chandler, Apopka, FL (US)

(73) Assignee: Analog Modules, Inc., Longwood, FL (US)

( * ) Notice: Subject to any disclaimer, the term of this patent is extended or adjusted under 35 U.S.C. 154(b) by 126 days.

(21) Appl. No.: 14/687,744

(22) Filed: Apr. 15, 2015

Related U.S. Application Data

(60) Provisional application No. 61/980,036, filed on Apr. 15, 2014.

(51) Int. Cl.
*F41G 7/22* (2006.01)
*G01C 3/08* (2006.01)

(52) U.S. Cl.
CPC ............. *F41G 7/2293* (2013.01); *G01C 3/08* (2013.01)

(58) Field of Classification Search
CPC .......... G01S 17/66; G01S 3/784; G01S 3/781; G01C 3/08; F41G 7/2293; F41G 7/226
See application file for complete search history.

(56) References Cited

U.S. PATENT DOCUMENTS

| | | | | |
|---|---|---|---|---|
| 2010/0185324 | A1* | 7/2010 | Ferrara | B25J 9/1638 700/245 |
| 2013/0070239 | A1* | 3/2013 | Crawford | G01S 17/66 356/139.04 |

* cited by examiner

*Primary Examiner* — Luke Ratcliffe
(74) *Attorney, Agent, or Firm* — Michael D. Eisenberg

(57) ABSTRACT

A technique is presented for tracking a target illuminated by a laser designator. A light beam scattered from the target in response to illumination by the designator is received and projected on a detector as an unfocused spot. The detector is divided into a plurality of sectors, each sector being adjacent to two sectors and all sectors meeting at a common point. Each sector outputs a signal indicative of a respective energy of the portion of the light beam illuminating the sector of the detector. A sum of the signals is determined. A plurality of ratios is determined, each ratio corresponding to a respective sector and being calculated by dividing a signal from the respective sector by the sum of the signals. The orientation of the system with respect to the target is determined based on the three ratios, via a look-up table and/or via one or more algorithms.

19 Claims, 7 Drawing Sheets

LASER SPOT TRACKING RECEIVER

CROSS-REFERENCES TO RELATED APPLICATIONS

The present application is a non-provisional of Provisional Patent Application 61/980,036 filed on Apr. 15, 2014, which is hereby incorporated herein by reference in its entirety.

TECHNICAL FIELD

The present invention generally relates to electronic guidance systems for weapons, and more in particular to guidance systems for laser-guided weapons (LGWs), such as— but not limited to—Semi-active laser (SAL) seekers.

BACKGROUND OF THE INVENTION

Laser-guided munitions (generally referred to as laser-guided bombs (LGBs), laser guided weapon systems (such as in an aircraft), or laser-guided weapons (LGWs) use a laser designator to mark (illuminate, "paint") a target. The reflected laser light ("sparkle") from the target is then detected by the seeker head of the weapon, which sends signals to the weapon's control surfaces (e.g., fins) to guide the weapon toward the designated point. The illuminating laser light is encoded, and the laser receiver in the LGW is set to react only to reflected laser light having the proper code.

FIG. 1 illustrates an exemplary procedure for aircraft with laser-guided weapons (LGWs) and laser spot trackers, as set forth in *Joint Pub* 3-09.1, *Joint Tactics, Techniques, and Procedures for Laser Designation Operations*, 28 May 1999, incorporated in its entirety by reference herein.

In this scenario 1, an aircraft 2 is equipped with a LGW 3 which is shown already in its ballistic trajectory towards a target 5. Also illustrated is a forward air controller (FAC), and a laser designator operator (LDO). The FAC is in radio communication with the pilot of the aircraft 2 and with the LDO. The LDO illuminates the target 3 with a laser, and laser light is reflected back, typically as scattered reflections called "sparkle".

Generally, the sequence of events is that the maneuver unit commander (not shown) decides to request close air support. The FAC coordinates laser code, laser target line and frequency and/or call sign of the LDO. The airstrike request includes laser-related data. An airstrike approval message is received, and the aircraft is dispatched to a contact point to check in with FAC. The FAC coordinates laser code, laser-target line and frequency and/or call sign with LDO and pilot. Approaching the target, the aircraft calls in. The FAC relays laser control calls. The LDO designates the target (by illuminating it with laser beam). The aircraft acquires the target or releases the LGW. The LGW heads towards the target, adjusting its trajectory based on sparkle from the laser-illuminated target. The target is destroyed.

Laser designators and seekers may use a pulse coding system to ensure that a specific seeker and designator combination work in harmony. Setting the same code in both the designator and the seeker enables the seeker to track only laser beams with the correct coding. The seeker may track the first correctly coded, significant laser energy it sees. The seeker may lock on to the most powerful return in its gate; choose the last pulse, or a selected logic. The pulse coding is usually based on pulse repetition frequency (PRF), but may be based on PIM (Pulse Interval Modulation) coding.

In the prior art, many techniques have been devised to improve the accuracy of the identification of the target by the seeker head of LGWs.

U.S. Pat. No. 5,350,134, incorporated in its entirety by reference herein, discloses target identification systems. A target identification system includes a target marker for selecting, and directing radiation at, a target, a weapon delivery system, and means for establishing a two-way communication channel between the two by reflection from a selected target. The communication is by infra-red laser and coded information is sent between the target marker and the weapon delivery system to identify the selected target.

U.S. Pat. No. 7,575,191 uses an engineered diffuser to generate a preferred square pattern on to a quadrant detector. The abstract, text and every claim describes a detector with at least two axes. U.S. Pat. No. 8,164,037 describes a dual mode SAL. FIG. 3A shows the traditional quadrant detector. U.S. Pat. No. 8,188,411 teaches a immersed filter stack and field lens. FIG. 3A shows the quadrant detector equations. U.S. Pat. No. 8,207,481 shows the use of a Fresnel lens with a sharp step used as an objective element. FIG. 2A shows the quadrant detector equations. U.S. Pat. No. 8,541,724 describes a smart weapon. Column 11 line 49 on describes the quadrant seeker. The use of a single defocused spot (see commonly-owned U.S. Pat. No. 8,451,432) is discussed in column 12. Commonly-owned application Ser. No. 14/672, 149 shows a method of homogenizing the spot based on a dual focus lens.

Laser designation and spot tracking is well known and is described in commonly-owned U.S. Pat. No. 7,773,202 issued 10 Aug. 2010, U.S. Pat. No. 8,451,432 issued 28 May 2013, and U.S. 61/971,651 filed 28 Mar. 2014

BRIEF SUMMARY OF EMBODIMENTS OF THE INVENTION

As seen before laser tracking systems, such as SAL, use a filter, lens, spreader or diffuser, and detector. The detector is usually a quadrant detector with axes that define the command direction, typically azimuth and elevation. Quadrant detectors are associated with electronic apparatuses for detecting light waves, generating data therefrom, and processing the data to determine the orientation of the target with respect to the seeker head.

This can be seen in FIGS. 2-4, which show systems of the prior art based on quadrant detectors, for determining the orientation of the target with respect to the seeker head.

In FIGS. 2 and 3, a lightbeam (e.g., laser beam) reflected from the target is enclosed between border rays 5 and 6. The dimensions (e.g. diameter) of the light beam may be defined by the input clear aperture size as required to collect enough energy to meet the maximum range requirement. The intensity of the total light falling on each segment causes a current to flow in the detector that is amplified and measured by the following electronics as shown in FIGS. 4 and 5. It should be noted that FIGS. 2 and 3 illustrate a two-dimensional side cross-sectional view of the system. Thus the segment between the beams 5a and 6a represent a three-dimensional shape where the beams 5a and 6a are located at the circumference or perimeter of the shape.

An optical apparatus 7 receives the light beam and directs one or more images of the beam toward a quadrant detector 8. The optical apparatus 7 is configured for projecting a non-focused image of the light beam on a sensing surface of the quadrant detector 8. The optical apparatus 7 may include one or more optical elements, such as a filter, mirror, lens, spreader or diffuser, and bifocal element to refract (FIG. 2)

and/or reflect (FIG. 3) the received laser beam and generate an unfocused spot thereof on the sensing surface of the quadrant detector. The position of the spot on the detector's sensing surface is indicative of a direction from which the light beam is received, and therefore can be processed by the processing apparatus 9 to determine the orientation of the LGW with respect to the target. This information can be processed to correct the orientation of the LGW so as to direct the LGW toward the target.

A front view of the sensing surface 7a of the detector 7 and a detailed drawing of the processing apparatus 9 are shown in FIG. 4. In the prior art, the detector's sensing surface is divided into four equal quadrants (a, b, c, and d) which meet at the center and define orthogonal axes in order to keep the data processing for two axes simple with historical analog processing.

The intensities measured at each quadrant may be summed by a sum channel 15 and detected by a comparator 25, before being received by a processing unit 30 which may include a complex analog processor or a digital signal processor (DSP). Each quadrant current is amplified by a respective amplifier (11, 12, 13, 14), may be converted into digital data by a respective analog-to-digital (A-D) converter (21, 22, 23, and 24), and transmitted to the processing unit 30. Each amplifier may have a switchable or variable gain control to handle the wide dynamic range needed, typically greater than 100,000 to 1. The DSP 30 converts the measurements into the angular position of the target with respect to a mechanical reference supporting the detector's sensing surface 7a.

An aim of the present invention is to reduce the cost, complexity and energy consumption of the hardware of the processing unit.

For this purpose, an aspect of some embodiments of the present invention relates to a tracking system in which the sensing surface of the detector is divided into three sectors. Because the number of the sectors is reduced, one of the amplifying channels is eliminated, thereby decreasing the energy consumption of the system by about 25%. Moreover, the larger area of each sector compared to quadrants of gives slightly better beam homogenization. Hot spots within the beam are often periodic and vary above and below the average intensity as a function of angle (spot detector position). Therefore, by measuring a larger area of the beam's image leads to better averages and smoother variations. Furthermore, having three detector sections that are bounded or interfaced produces more accurate measurements, as the interface regions between the detector sections that typically produce less response to light are reduced by 25%.

Therefore, an aspect of some embodiments of the present invention relates to a system for tracking at least one object being illuminated by a laser designator, the system being configured for use in conjunction with an optical apparatus configured for receiving a light beam scattered by the at least one object in response to illumination from the laser designator. The system comprises a detector and a data processing apparatus. The detector has a sensing surface divided into three sectors, each sector is adjacent to two sectors, and all sectors meeting at a central point. The sensing surface of the detector is positioned with respect to the optical apparatus such that the laser beam is projected by the optical apparatus onto the sensing surface as an unfocused spot, and each sector is configured for generating a respective signal indicative of an energy of a portion of the spot illuminating the sector. The data processing apparatus is configured for receiving the signals from the detector, and processing the signals to determine an orientation of the system with respect to the at least one target.

In a variant, the data processing apparatus comprises a processing unit and is associated with a non-volatile memory unit. The processing unit is configured for (i) receiving the signals from the sectors, (ii) determining a sum of the signals, (iii) determining three ratios, each ratio corresponding to a respective sector and being calculated by dividing a signal from the respective sector by the sum of the signals, and (iv) determining the orientation of the system with respect to the at least one target based on the three ratios. The non-volatile memory unit is configured for storing at least one of a look-up table and an algorithm. In the look-up table, a set of the three ratios leads to a unique value indicative of the orientation of the system with respect to the at least one target. The algorithm is configured for enabling the processing unit to calculate the orientation of the system with respect to the at least one target based on the three ratios.

Optionally, the processing unit is configured for: determining the sum of the signals by summing amplitudes or powers of the signals; and calculating the three ratios by dividing each amplitude, power or energy of each signal by the sum of the signals' amplitudes, powers or energies of the signals.

In another variant, the data processing apparatus comprises a processing unit and is associated with a non-volatile memory unit. The processing unit is configured for (i) receiving a video of the sector signal measurements over time, (ii) processing the videos to determine targets of interest, and then processing the videos of interest from sectors A, B, and C, (iii) determining three ratios, each ratio corresponding to a respective sector and being calculated by dividing a measurement derived from the video for each sector by the sum of the corresponding measurements for all sectors, (iv) determining the orientation of the system with respect to the at least one target based on the three ratios. The non-volatile memory unit is configured for storing at least one of: a look-up table wherein a set of the three ratios leads to a unique value indicative of the orientation of the system with respect to the at least one target; and an algorithm configured for enabling the processing unit to calculate the orientation of the system with respect to the at least one target based the three ratios.

In yet another variant, the sensing surface of the detector is divided by interfaces into sector encompassing about 120 degrees, with the junction of the sectors at the center of the sensing surface.

In a further variant, the sensing surface of the detector is circular and is divided by interfaces into sector encompassing about 120 degrees, with the junction of the sectors at the center of the circular sensing surface.

In yet a further variant, the system comprises three amplifiers, each amplifier being configured for amplifying each signal prior to the processing of the signals by the data processing apparatus.

Optionally, the system comprises at least three analog-to-digital converters, each converter being configured for converting each signal into respective digital data prior to the processing of the signals by the data processing apparatus.

In a variant, the processing apparatus comprises at least one of a microprocessor and a field-programmable gate array (FPGA).

In another variant, the processing apparatus comprises the non-volatile memory unit.

In yet another variant, the non-volatile memory unit is configured for storing a correction table or a correction algorithm, configured for being used by the processing unit to correct for non-linearities and/or, errors, and/or offsets in a location of a centroid's of the spot with respect to the central point, the centroid's location being indicative of the orientation of the system with respect to the at least one target and being usable to determine the orientation of the system with respect to the at least one target.

In a further variant, the system comprises a comparator configured for comparing the sum to a threshold noise level, and to allow transmission of the sum and of the signals if the sum is above the threshold noise level.

In yet a further variant, the processing apparatus comprises a decoder configured for checking a coding of the sum signal against one or more known codings, and to enable processing of the signals and of the sum signal only if the coding of the sum signal corresponds to one of the one or more known codings.

Another aspect of some embodiments of the present invention relates to a system for tracking at least one object being illuminated by a laser designator. The system comprises an optical apparatus, a detector, and a data processing apparatus. The optical apparatus is configured for receiving a light beam scattered by the at least one object in response to illumination from the laser designator. The detector has a sensing surface divided into three sectors, each sector being adjacent to two sectors and all sectors meeting at a central point. The sensing surface of the detector is positioned with respect to the optical apparatus such that the laser beam is projected by the optical apparatus onto the sensing surface as an unfocused spot, and each sector is configured for generating a respective signal indicative of an energy of a portion of the spot illuminating the sector. The data processing apparatus is configured for receiving the signals from the detector, and processing the signals to determine an orientation of the system with respect to the at least one target.

Optionally, the data processing apparatus comprises a processing unit and is associated with a non-volatile memory unit. The processing unit is configured for (i) receiving the signals from the sectors, (ii) determining a sum of the signals, (iii) determining three ratios, each ratio corresponding to a respective sector and being calculated by dividing a signal from the respective sector by the sum of the signals, and (iv) determining the orientation of the system with respect to the at least one target based on the three ratios. The non-volatile memory unit is configured for storing at least one of: a look-up table wherein a set of the three ratios leads to a unique value indicative of the orientation of the system with respect to the at least one target; and an algorithm configured for enabling the processing unit to calculate the orientation of the system with respect to the at least one target based on the three ratios.

A further aspect of some embodiments of the present invention relates to a system for tracking at least one object being illuminated by a laser designator, the system being configured for use in conjunction with an optical apparatus configured for receiving a light beam scattered by the at least one object in response to illumination from the laser designator. The system comprises a detector and a data processing apparatus. The detector has a sensing surface divided into a plurality of sectors, each sector being adjacent to two sectors and all sectors meeting at a central point, the sensing surface of the detector being positioned with respect to the optical apparatus such that the light beam is projected by the optical apparatus onto the sensing surface as an unfocused spot, and each sector being configured for generating a respective signal indicative of an energy of a portion of the spot illuminating the sector. The data processing apparatus configured for receiving the signals from the detector, and processing the signals to determine an orientation of the system with respect to the at least one target. The data processing apparatus comprises a processing unit and is associated with a non-volatile memory unit. The processing unit is configured for (i) receiving the signals from the sectors, (ii) determining a sum of the signals, (iii) determining a plurality ratios, each ratio corresponding to a respective sector and being calculated by dividing a signal from the respective sector by the sum of the signals, and (iv) determining the orientation of the system with respect to the at least one target based on the three ratios. The non-volatile memory unit is configured for storing at least one of: a look-up wherein a set of the three ratios leads to a unique value indicative of the orientation of the system with respect to the at least one target; and an algorithm configured for enabling the processing unit to calculate the orientation of the system with respect to the at least one target based on the ratios.

Yet a further aspect of some embodiments of the present invention relates to a method for tracking at least one object being illuminated by a laser designator. The method comprises: (i) receiving signal outputs from sectors of a detector illuminated by a light beam scattered from the target in response to target being illuminated by the designator, the detector being divided into a plurality of sectors, each sector being adjacent to two sectors and all sectors meeting at a common point, the signal outputs being indicative of respective energies of the portions of the light beam illuminating the respective sectors of the detector; (2) determining a sum of the signals; (3) determining a plurality of ratios, each ratio corresponding to a respective sector and being calculated by dividing a signal from the respective sector by the sum of the signals; and (4) determining the orientation of the system with respect to the at least one target based on the three ratios, via a look-up table and/or via one or more algorithms.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
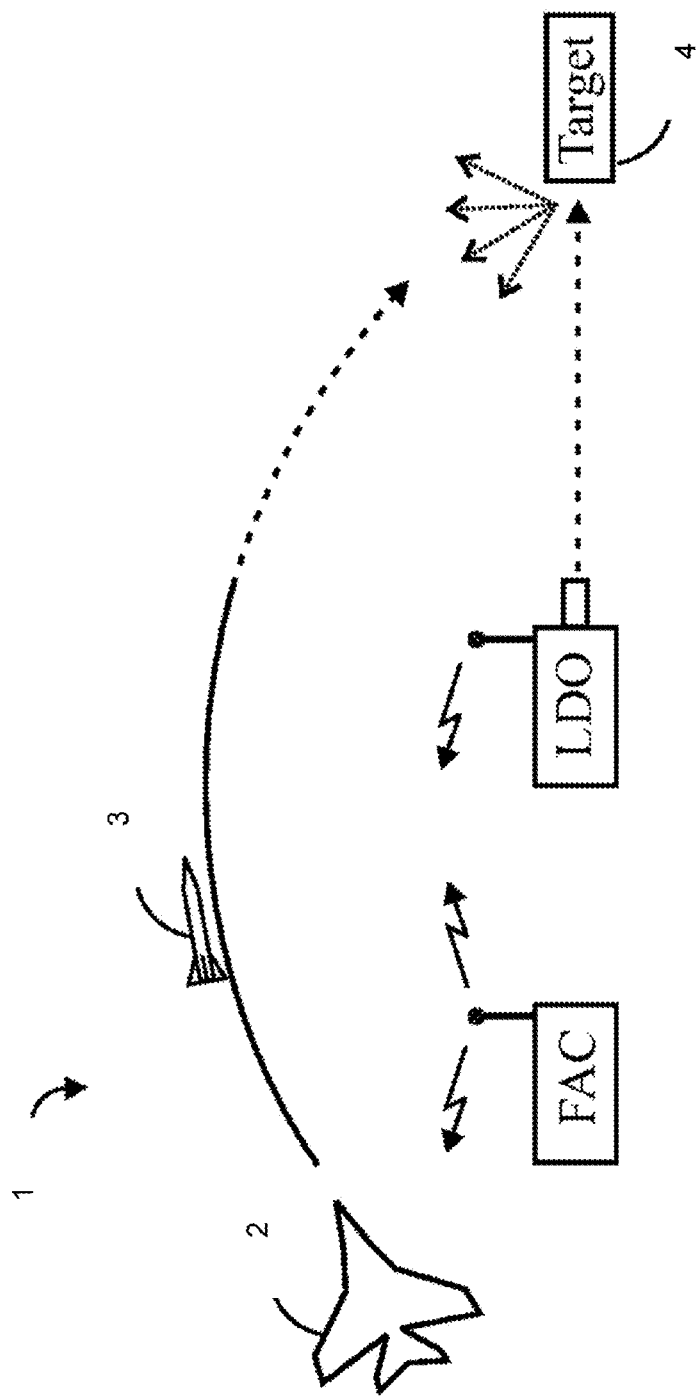
Figure 2:
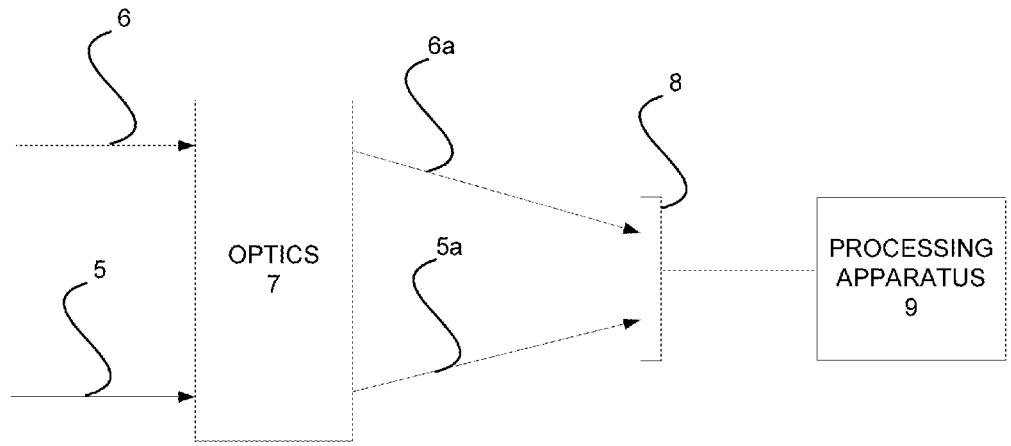
Figure 3:
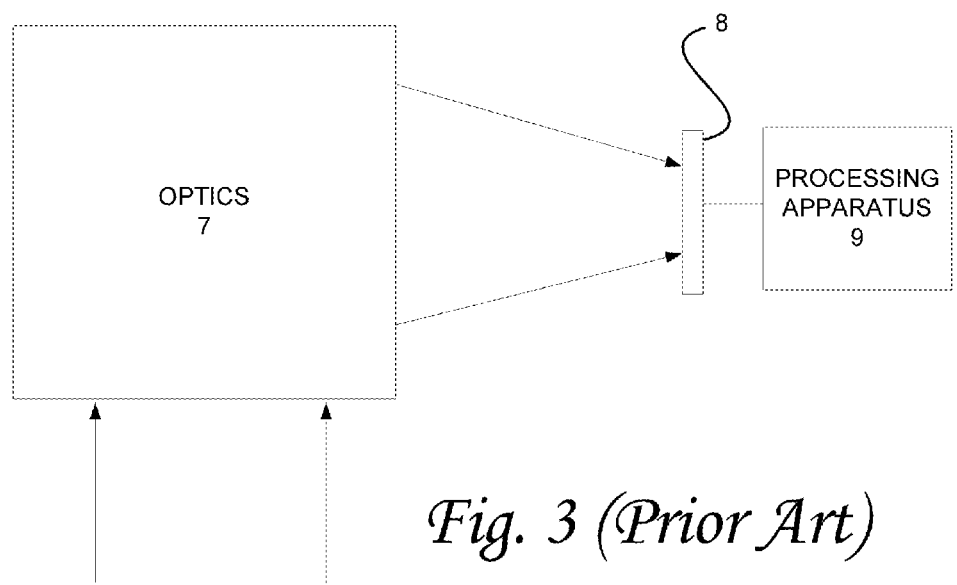
Figure 4:
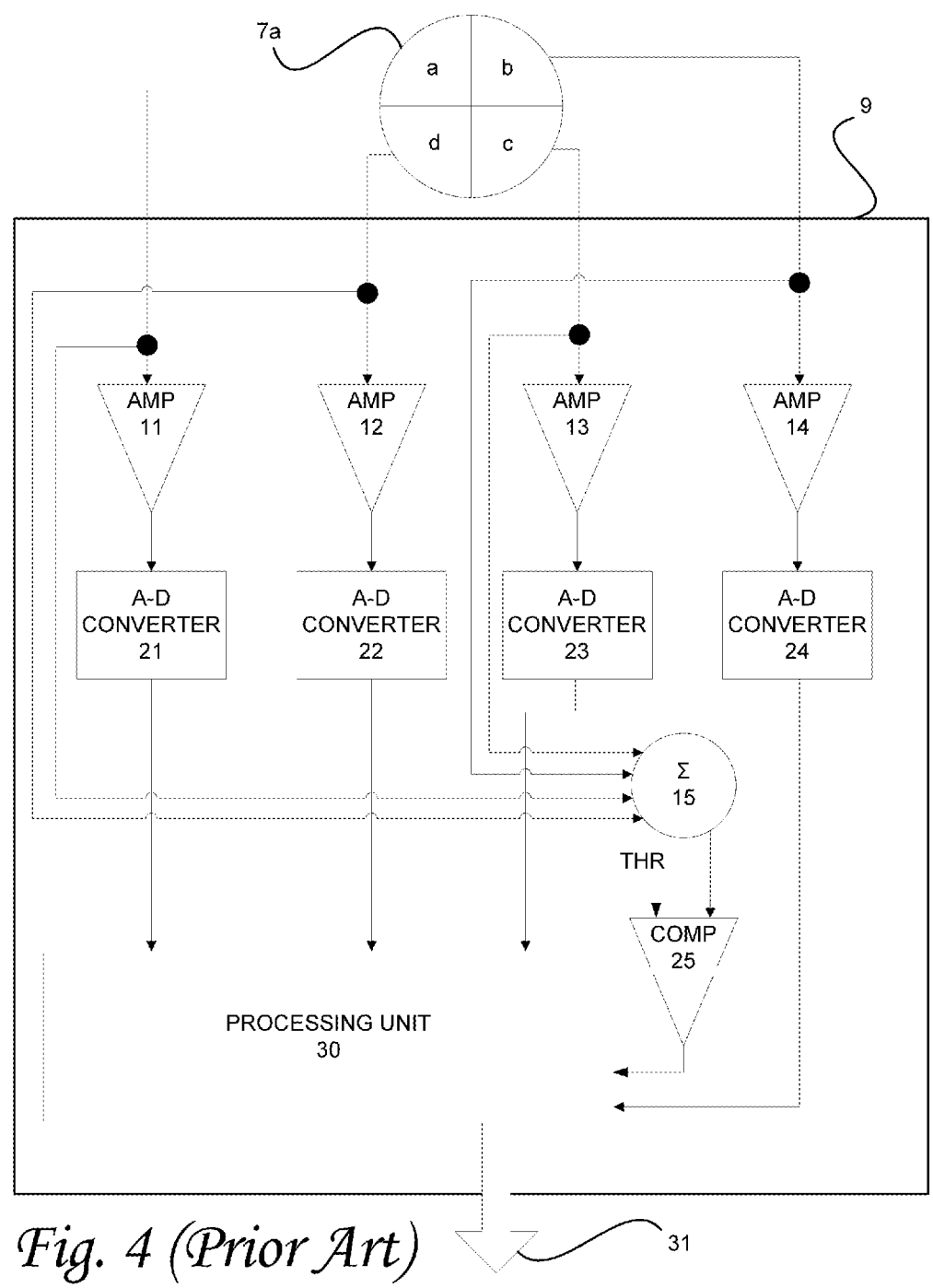
Figure 5:
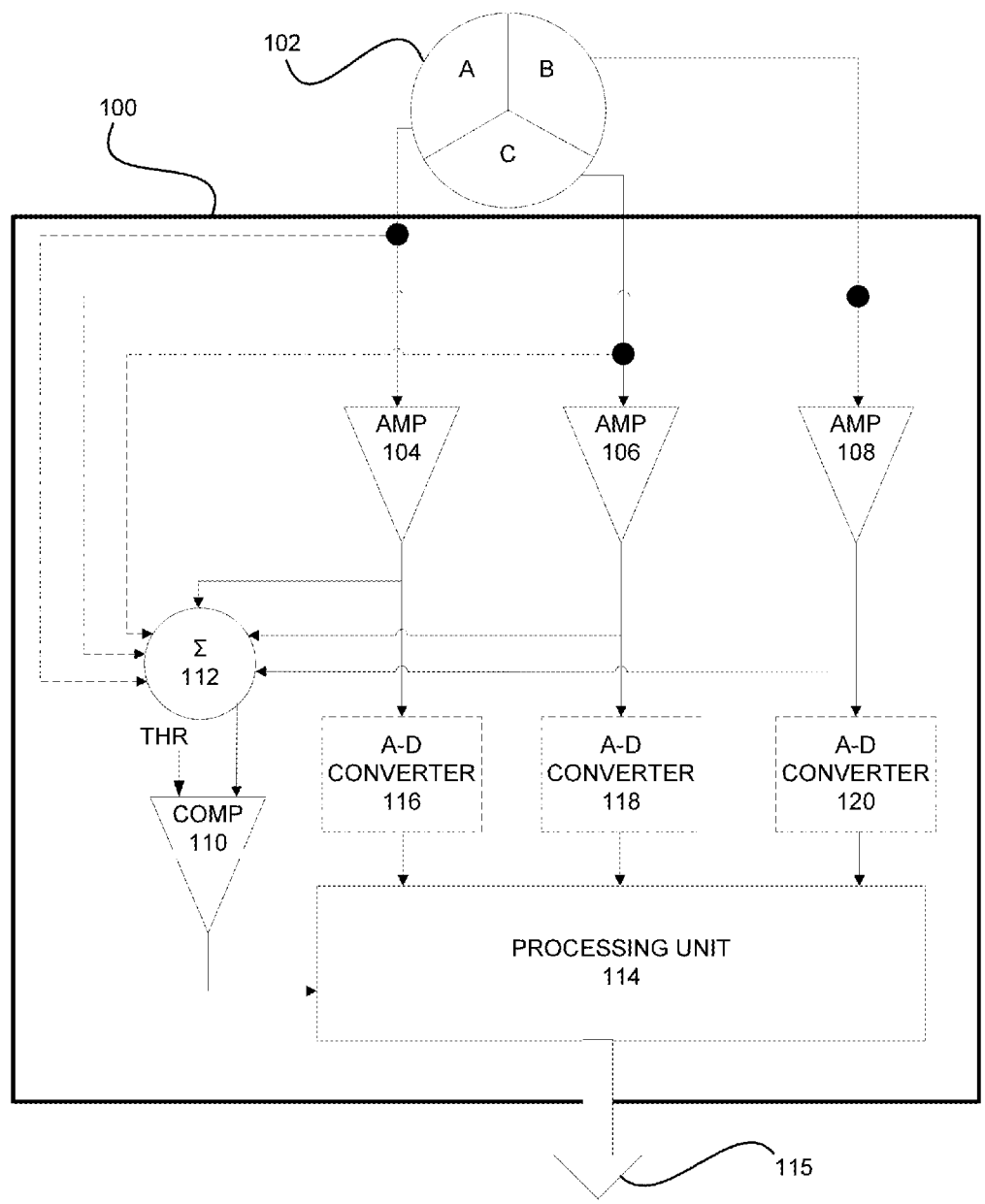
Figure 6:
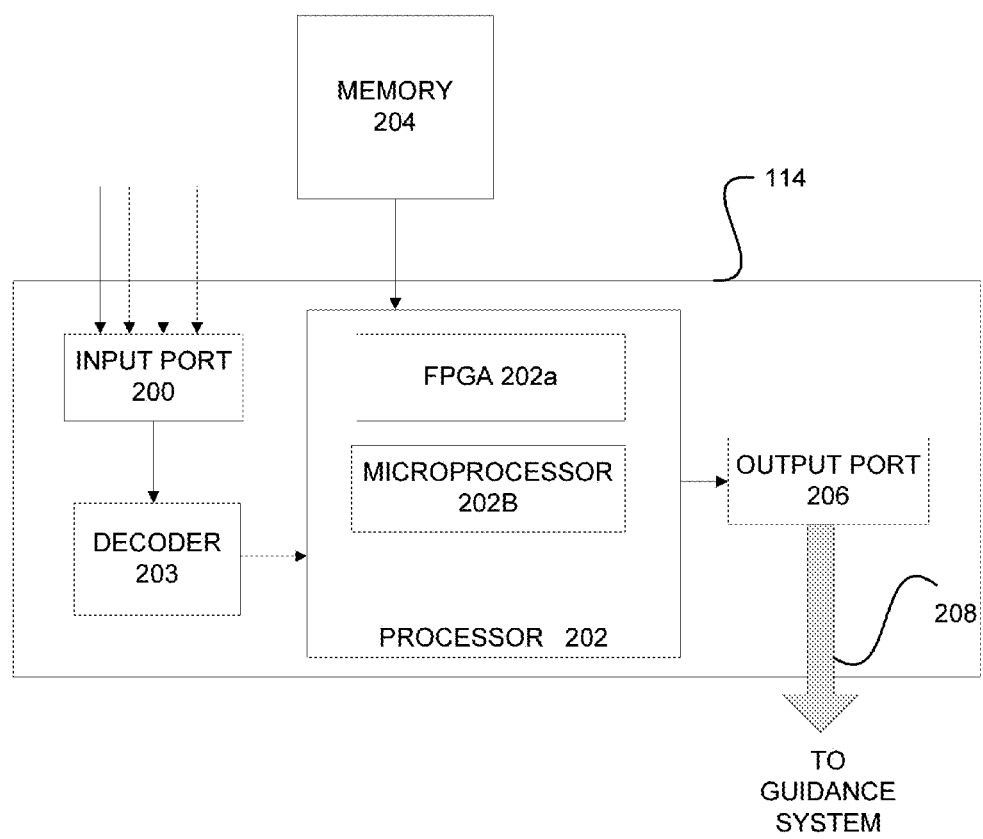
Figure 7:
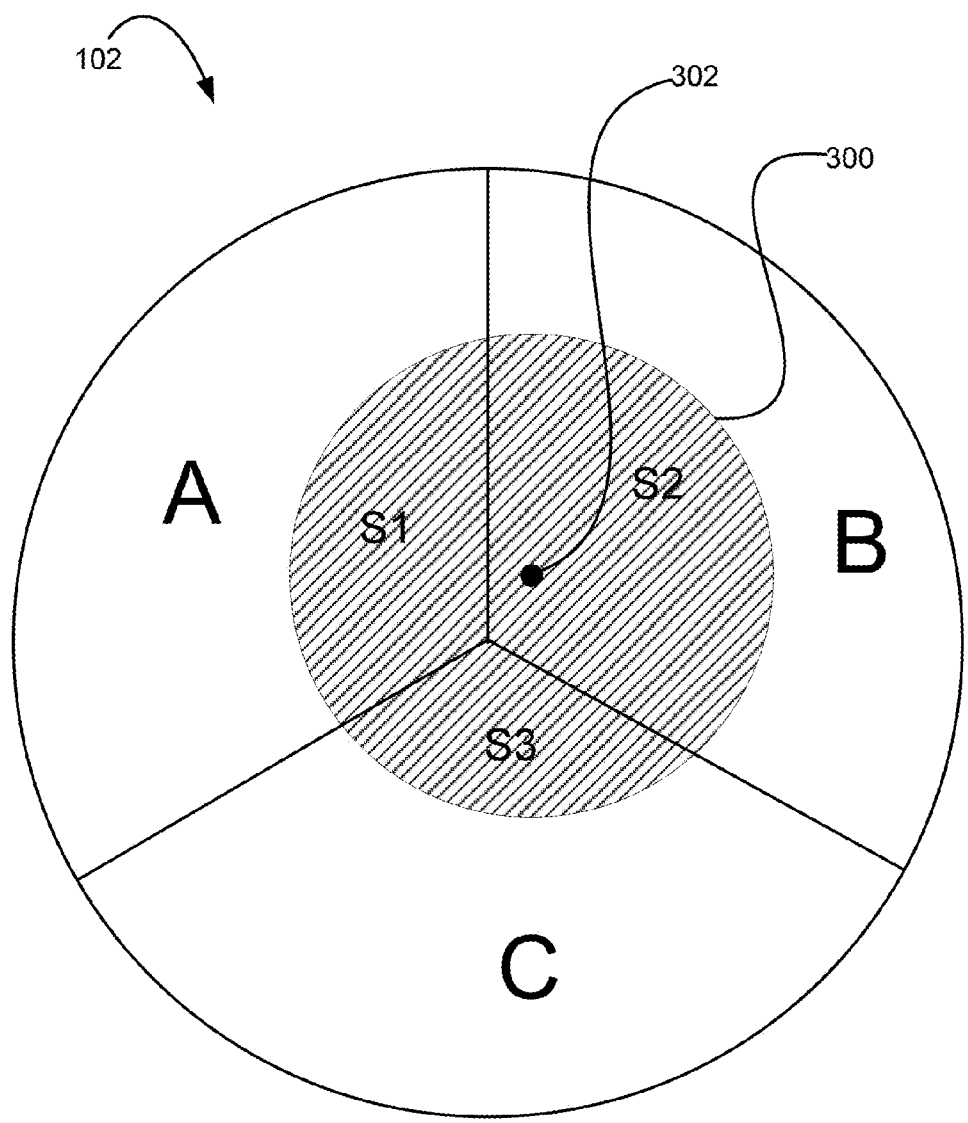
Figure 8:
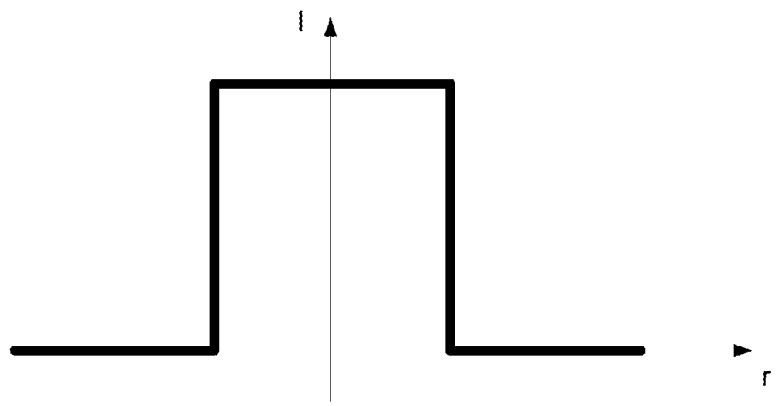
Figure 9:
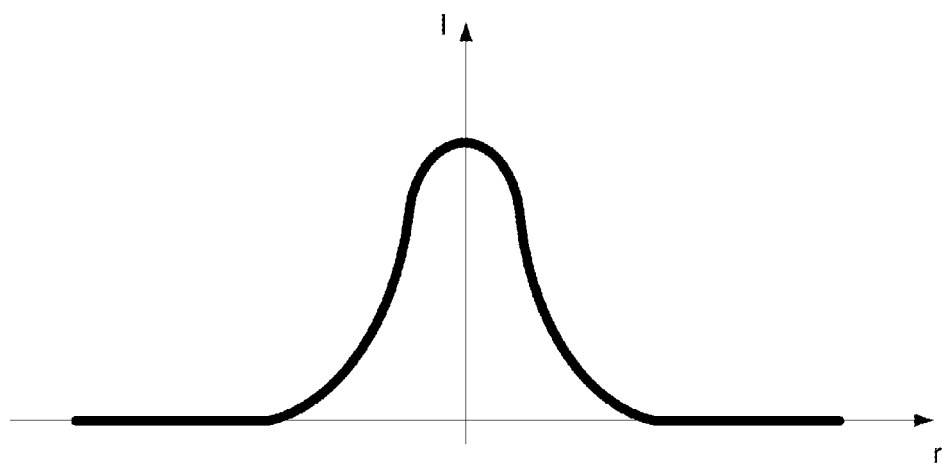

These and other features, aspects, and advantages of the present inventions will become better understood with regard to the following description, appended claims and drawings where:

FIG. 1 is a drawing that illustrates a mode of operation of LGWs, for guiding the LGWs to a target, as known in the art;

FIG. 2 is a schematic drawing illustrating a side cross section of a system of the prior art having a refractive optical apparatus and a quadrant detector;

FIG. 3 is a schematic drawing illustrating a side cross section of a system of the prior art having a reflective optical apparatus and a quadrant detector;

FIG. 4 is a schematic drawing illustrating a processing apparatus and a front view of the quadrant detector, as known in the prior art;

FIG. 5 is a schematic drawing illustrating a processing apparatus and a front view of a three-sector detector, according to some embodiments of the present invention;

FIG. 6 is a schematic drawing illustrating details of the processing unit of the processing apparatus of FIG. 5, according to some embodiments of the present invention;

FIG. 7 is a schematic drawing illustrating an image of a light beam on the sensing surface of the detector of FIG. 5, according to some embodiments of the present invention; and FIGS. 8 and 9 are graphs illustrating different energy profiles of the light beam as functions of a distance from a center of the light beam.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Referring now to FIG. 5, a schematic drawing illustrates a processing apparatus 100 and a front view of a three-sector detector 102, according to some embodiments of the present invention.

The detector 102 and the processing apparatus 100 are configured for being used in conjunction with an optical apparatus, such that the optical apparatus receives a light beam and projects an unfocused image of the light beam on a sensing surface of the detector 102.

The detector 102 has a sensing surface divided into three sectors, which may or may not be equal in size, such that each sector is sided by the other two sectors and the three sectors meet in the center of the detector's sensing surface. These three sectors may be very accurately defined using precision lithography as is known by detector manufacturers' using precision lithography. In the preferred embodiment of the present invention, each sector is of equal area and the detector is circular, such that the sectors are separated by a "Y" shape segment sector interfacing at 120 degree subtends.

The detector is configured for converting an intensity of pulsed incoming light at each sector (sectors A, B, and C) into an electrical signal. The processing apparatus 100 is configured for receiving the electrical signals or currents, and processing the amplitude or energy data to determine an angular position of the target from which the light beam has been reflected with respect to a mechanical reference supporting the detector's sensing surface.

The processing apparatus 100 includes a sum channel 112, and a processing unit 114. The processing unit 114 may include a complex analog processor or a digital signal processor (DSP). In the embodiment in which the processing unit includes a DSP, three analog-to-digital (A-D) converters (116, 118, and 120) are also included. The processing apparatus may also include three amplifiers (104, 106, and 108), In a typical silicon or InGaAs detector, a pulsed signal current is output by each sector of the detector 102 proportional to the pulsed light power illuminating the respective sector. The photocurrent from each sector is amplified by a respective amplifier and converted to digital data by a respective A-D converter, if needed. The gain of the amplifier may be switchable or variable so that the signal is kept within the dynamic range of the amplifiers and A-D converters. Alternatively, logarithmic compression may be used to improve the dynamic range. Typically the dynamic range is above 100,000 to 1.

Thus, photocurrent from section A is amplified by the amplifier 104, typically converted to digital format by the A-D converter 116, and is received by the processing unit 114. Photocurrent from section B is amplified by the amplifier 106, typically converted to digital format by the A-D converter 118, and is received by the processing unit 114. Photocurrent from section C is amplified by the amplifier 108, typically converted to digital format by the A-D converter 120, and is received by the processing unit 114.

The signals from all sectors are also transmitted to a sum channel 112, which is configured to output a sum of signals from all sections. The sum channel may be separate from the processing unit 114, or may be integrated therein.

The sum output by the sum channel 112 may be used to determine the presence of a correctly coded target above the noise level. For this purpose a threshold is set to determine whether the energy of the light beam is above a predetermined level and therefore has an energy corresponding to the known energy level of the laser designator. The signal sum is input into a comparator 110. If the sum does not exceed the threshold, the signal sum of the three signals is rejected and not processed. If the sum exceeds the threshold, the signal sum is received by the processing unit, which includes a decoder and is configured for decoding the signal time to checking whether the light beam's coding (e.g., PRF or PIM) is valid. The section signals may be summed in the processing unit 114 to create a sum signal measurement typically used to control the channel gains. The threshold minimum is typically set from measuring the noise level and scaling it.

As the angle at which the light beam meets the optical apparatus main axis changes, the spot/image moves across the detector's sensing surface. The round spot gives efficient use of the detector's circular area before dropping off the detector edge at the field of view extremes. The detector spot characteristics are set by the spreader or diffuser element, defocusing, or the dual focus solution as disclosed in application Ser. No. 14/672,149, or a combination thereof.

Once the three values of the A, B and C sector amplitudes/intensities are measured, the ratios of energy in the sectors is calculated by the processing unit 114. For example $I_A/(I_A+I_B+I_C)$; $I_B/(I_A+I_B+I_C)$; and $I_C/(I_A+I_B+I_C)$. $I_A$, $I_B$, $I_C$ are intensities of the signals generated by sectors A, B, and C, respectively. The position of the spot's centroid from the major optical axis (which corresponds to null, which is the angle at which all three sectors have equal energy in a detector is having sectors of equal areas), can be determined via a look up table or direct calculations by the processing unit 114. For example, the energies in sectors A, B, and C may be 25%, 51%, and 24% of the total energy, respectively. This unique energy distribution is associated with a unique spot centroid distance from the detector center which relates to a target angle of the incoming light beams through the optical system with respect to the detector and optics mounting frame of reference.

To convert this spot or centroid position on the detector into target angles from the major optical axis, the angular transfer function of the optical system is taken into account by the look up table or equations. It is desirable for the spot energy profile to be the same in any roll direction and this is true if the spot energy is symmetrical about the detector center. In this case a single set of transfer conversion factors may be used for any roll position in polar co-ordinates. A simplified look up table or calculation that incorporates both the spot position and the optical transfer function may be used.

The value of each sector measurement may be represented as a fraction of the sum of all sector measurements. For example, the value associated with sector A may be 0.25, the value associated with sector B may be 0.51 and the value associated with sector C may be 0.24. Using a three dimensional look up table, the values associated with sectors A, B, and C lead to a cell specifying a unique angular direction to the target from the detector frame reference. It is also possible to solve the target direction using equations from the raw ratios and use the processing unit 114 to perform the necessary mathematics. A combination of the two methods (look-up table and on-line calculations) may also be used by the processing unit 114.

The values of the look-up table and/or the equations used for calculating the angular direction to the target from the detector frame of roll reference depend on the optical apparatus' dimensions and characteristics. The look up table or equations may be uniquely populated depending on the dimensions and characteristics of the optical apparatus.

It is time consuming to enter such correction factors or target direction manually. For this purpose, techniques for automatic calibrations have been developed. Commonly owned U.S. Pat. No. 8,619,239 describes a method for automatically calibrating the range of a range receiver and loading a correction table. To maximize angular accuracy, the detector may be mounted on a rotating platform and stepped through a range of input angles, thus moving the spot centroid across the detector face. As each input angle is mechanically known, the correct data for the associated output angle co-ordinate is entered into the lookup table or equation parameters. Optionally, two orthogonal axes mounts driven by stepper motors are used for the calibration process, as commercially available such as Newport Universal Motion Controller/Driver ESP300 with URM Precision Rotation Stages. By selecting combinations of drive pulses for the motors from a reference position, the field of view may be scanned in the X and Y axis with a resolution depending on the angular step of each pulse. It is also possible to rotate the tracker in roll steps about the major optical axis, and position the test target source or roll the detector mount at various angles to check or set the calibration points. At each point, the correct target input angle is automatically written into the lookup table cell matrix stored in the DSP for the ratio of signal strengths in sectors A, B and C compared to the sum of the signals. To reduce the table size or to improve accuracy further, mathematical extrapolation can be used between close cell values to arrive at an accurate target angular position.

Once the centroid position is known, data indicative of the centroid position may be output in any desired format or reference axis, including the traditional azimuth or elevation. Known geometric calculations are performed in the processing unit 114, which optionally incorporates both gate array and microprocessor sections.

In some embodiments of the present invention, the processing unit 114 includes a modern DSP. Within the DSP the Laser Detect threshold may be formed by sampling a video from all segments, summing and measuring the noise baseline level using arithmetic processing as is well known in oscilloscopes and instruments. This may be done using a field-programmable gate array (FPGA) or a microprocessor, or a combination of both. In the embodiment in which both FPGA and microprocessor are included in the processing unit, the FPGA may handle the high bandwidth data from the laser pulse digitization strength measurements and critical timing, while the microprocessor may efficiently handle arithmetic calculations. The detection threshold for the laser pulses is set several times the root mean squared (rms) noise level as a minimum to avoid false detections.

FIG. 6 is a schematic drawing illustrating details of the processing unit 114 of the processing apparatus of FIG. 5, according to some embodiments of the present invention;

The processing unit 114 includes an input port 200, processor 202, and an output port 206. The processing unit may be associated with or may include a non-volatile memory unit 204, which stores a look-up table and/or one or more equations to determine the target angular position from the spot's centroid with respect to null as represented by the ratio of the signal in each sector. The processing unit 114 may also include a decoder 203, are mentioned above. The decoder 203 is configured for checking a coding of the sum signal, and for enabling the signals to be processed by the processor 202 if the coding is correct.

The amplified signal from the detector is received by the input port 200. The processor 202, which may include at least one FPGA and/or at least one microprocessor as explained above, receives the data and processes the data accordingly by dividing the signal output of each sector of the detector, by the total sum signal output of all sectors. The processor 202 plugs in the resulting ratios into the look-up table and/or into the equation(s) to determine the position of the target angle. Data indicative of the position of the target angles is transmitted by the processor 202 to the output port 206. The output port 206 is configured for transmitting this data to a guidance system of the LGW, to enable the guidance system to keep the LGW on track toward the target.

FIGS. 8 and 9 are graphs illustrating different energy profiles of the spot. FIG. 8 shows a cross-section of the spot energy with a "top hat" implementation, where the spot on the detector is circular and homogeneous. This simplifies the conversion of sector energy to incoming light ray angle as the energy is directly proportional to spot area in each sector and can be calculated by circle geometry. This situation with a sharp cut off is hard to achieve due to optical aberrations and beam homogeneity issues. FIG. 9's beam profile indicates a spot cross-section where the spot edges are more gradual as might be caused by an aperture smoothing diffuser and/or dual focus beam mixer. In this case the energy ratio in each sector is used by the DSP to calculate or look up the angle of incident light with respect to the major axis and roll reference, taking account of the effects of the angular transfer function of the optical system 7 of FIG. 3.

FIG. 7 is a schematic drawing illustrating an image of a light beam on the sensing surface of the detector of FIG. 5, according to some embodiments of the present invention. The simple spot 300 has a centroid 302. A surface S1 of the spot 300 illuminates sector A of the detector's sensing surface, a surface S2 of the spot 300 illuminates sector B, and a surface S3 of the spot 300 illuminates sector C. A pulsed current flows in each sector proportional to the light power in its surface.

The pulse current in each sector from a single target may be simultaneously measured and the value of peak power or energy (pulse area) stored, and either by a look up table or an algorithm encompassing the known spot shape and the known optical angular transfer function, the angle measurement or co-ordinates of the target can be determined with respect to the mounting reference. The result may be output in various ways such as, but not limited to:

a) An angle from the main optical axis and a roll angle from a reference like 12 o'clock based on a Polar system;

b) Two angles from defined reference axes, and c) Co-ordinates in a Cartesian system such as azimuth and elevation values representing a viewed target position through an optical system or display.

The spot may occur simultaneously in all illuminated sectors, one sectors or two sectors, and may be processed by the A-D's and processing unit with a time tag to determine the PRF (pulse repetition frequency) or PIM (pulse interval module) code used. This time tagging is preferably derived from the output signal transition of the sum channel comparator 110 shown in FIG. 5 so that it is independent of sector signal fluctuations due to angular changes. Multiple targets may be processed, as they may occur at different times with different sector values and hence different derived angles. The sector A-D sampling occurs simultaneously in all channels for each possible target as identified in the sum channel. The processing unit may process the information for each target, and may store the information in the memory unit so that is available for analysis, selection, or use.

In some embodiments of the present invention, the optics are set such that the spot size is optimized so that the spot is in the linear region where the spot encompasses all three sectors. In this region, the target position can be resolved. When the spot is in a single sector, the approximate direction to the target is known, but not the exact target angular position because there is no signal in the other sectors to create a ratio other than unity for the illuminated sector.

When the spot is in 2 sectors, the target position can be determined on a line, but not a point, because the value of one sector is zero and therefore the degree of movement of the spot away from that sector is indeterminate. The ratio of light on the other 2 sectors allows an angular determination in only one axis from the interface of the 2 working sectors as a reference line.

For SAL applications using a laser receiver and tracker module fixed to the projectile body, it is likely that the projectile must fly at an angle not pointing at the target for steering reasons. It is desired that the reflections from the target create a spot within the linear field of view as this provides more accurate steering information. Optionally the spot diameter size is set to be approximately half the detector diameter, preferably with side slopes. At the extreme of the field of view, the small but measurable energy on all the sectors allows a maximum linear region for steering information. Also, the energy lost at the angle extremes as the spot edges move off the detector is minimized. The accuracy of the derived target angular position may degrade due to the lost energy as the spot centroid approaches the extremes of the field of view in the cut off sectors, resulting in angle output errors. The general direction of the target is predicted and steering the vehicle towards the null position will result in regained accuracy as the spot moves back on to the detector.

With regard to the description of FIGS. 5-9, it should be noted that the technique for analyzing the data by determining the ratios of areas or signal strengths as compared to the total area or signals strengths is not limited to the use of the three-sector detector described above. Data/signals from any detector divided into a plurality of sections meeting at a common point can be used and analyzed as described above.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for tracking at least one object being illuminated by a laser designator, the system being configured for use in conjunction with an optical apparatus configured for receiving a light beam scattered by the at least one object in response to illumination from the laser designator, the system comprising:
   a detector having a sensing surface divided into three sectors, each sector being adjacent to two sectors and all sectors meeting at a central point, the sensing surface of the detector being positioned with respect to the optical apparatus such that the laser beam is projected by the optical apparatus onto the sensing surface as an unfocused spot, and each sector being configured for generating a respective signal indicative of an energy of a portion of the spot illuminating the sector;
   a data processing apparatus configured for receiving the signals from the detector, and processing the signals to determine an orientation of the system with respect to the at least one target.

2. The system of claim 1, wherein the data processing apparatus comprises a processing unit and is associated with a non-volatile memory unit, wherein:
   the processing unit is configured for (i) receiving the signals from the sectors, (ii) determining a sum of the signals, (iii) determining exactly three ratios, each ratio corresponding to a respective sector and being calculated by dividing a signal from the respective sector by the sum of the signals, and (iv) determining the orientation of the system with respect to the at least one target based on the three ratios;
   the non-volatile memory unit is configured for storing at least one of:
   a look-up table wherein a set of the three ratios leads to a unique value indicative of the orientation of the system with respect to the at least one target; and
   an algorithm configured for enabling the processing unit to calculate the orientation of the system with respect to the at least one target based on the three ratios.

3. The system of claim 2, wherein the processing unit is configured for:
   determining the sum of the signals by summing amplitudes or powers of the signals; and
   calculating the three ratios by dividing each amplitude, power or energy of each signal by the sum of the signals' amplitudes, powers or energies of the signals.

4. The system of claim 1, wherein the data processing apparatus comprises a processing unit and is associated with a non-volatile memory unit, wherein:
   the processing unit is configured for (i) receiving a video of the sector signal measurements over time, (ii) processing the videos to determine targets of interest, and then processing the videos of interest from sectors A, B, and C, (iii) determining exactly three ratios, each ratio corresponding to a respective sector and being calculated by dividing a measurement derived from the video for each sector by the sum of the corresponding measurements for all sectors, (iv) determining the orientation of the system with respect to the at least one target based on the three ratios;

the non-volatile memory unit is configured for storing at least one of:
  a look-up table wherein a set of the three ratios leads to a unique value indicative of the orientation of the system with respect to the at least one target; and
  an algorithm configured for enabling the processing unit to calculate the orientation of the system with respect to the at least one target based the three ratios.

5. The system of claim 1, wherein the sensing surface of the detector is divided by interfaces into sector encompassing about 120 degrees, with the junction of the sectors at the center of the sensing surface.

6. The system of claim 1, wherein the sensing surface of the detector is circular and is divided by interfaces into sector encompassing about 120 degrees, with the junction of the sectors at the center of the circular sensing surface.

7. The system of claim 1, comprising three amplifiers, each amplifier being configured for amplifying each signal prior to the processing of the signals by the data processing apparatus.

8. The system of claim 1, comprising three analog-to-digital converters, each converter being configured for converting each signal into respective digital data prior to the processing of the signals by the data processing apparatus.

9. The system of claim 1, wherein the processing apparatus comprises at least one of a microprocessor and a field-programmable gate array (FPGA).

10. The system of claim 2, wherein the processing apparatus comprises the non-volatile memory unit.

11. The system of claim 4, wherein the processing apparatus comprises the non-volatile memory unit.

12. The system of claim 2, wherein the non-volatile memory unit is configured for storing a correction table or a correction algorithm, configured for being used by the processing unit to correct for non-linearities and/or, errors, and/or offsets in a location of a centroid of the spot with respect to the central point, the centroid's location being indicative of the orientation of the system with respect to the at least one target and being usable to determine the orientation of the system with respect to the at least one target.

13. The system of claim 4, wherein the non-volatile memory unit is configured for storing a correction table or a correction algorithm, configured for being used by the processing unit to correct for non-linearities and/or, errors, and/or offsets in a location of a centroid's of the spot with respect to the central point, the centroid's location being indicative of the orientation of the system with respect to the at least one target and being usable to determine the orientation of the system with respect to the at least one target.

14. The system of claim 2, comprising a comparator, the comparator being configured for comparing the sum of three channels to a threshold noise level, and to allow transmission of the sum and of the signals if the sum is above the threshold noise level.

15. The system of claim 2, wherein the processing apparatus comprises a decoder configured for checking a coding of the sum signal against one or more known codings, and to enable processing of the signals and of the sum signal only if the coding of the sum signal corresponds to one of the one or more known codings.

16. A system for tracking at least one object being illuminated by a laser designator, the system comprising:
  an optical apparatus configured for receiving a light beam scattered by the at least one object in response to illumination from the laser designator,
  a detector having a sensing surface divided into three sectors, each sector being adjacent to two sectors and all sectors meeting at a central point, the sensing surface of the detector being positioned with respect to the optical apparatus such that the laser beam is projected by the optical apparatus onto the sensing surface as an unfocused spot, and each sector being configured for generating a respective signal indicative of an energy of a portion of the spot illuminating the sector;
  a data processing apparatus configured for receiving the signals from the detector, and processing the signals to determine an orientation of the system with respect to the at least one target.

17. The system of claim 16, wherein the data processing apparatus comprises a processing unit and is associated with a non-volatile memory unit, wherein:
  the processing unit is configured for (i) receiving the signals from the sectors, (ii) determining a sum of the signals, (iii) determining exactly three ratios, each ratio corresponding to a respective sector and being calculated by dividing a signal from the respective sector by the sum of the signals, and (iv) determining the orientation of the system with respect to the at least one target based on the three ratios;
  the non-volatile memory unit is configured for storing at least one of:
    a look-up table wherein a set of the three ratios leads to a unique value indicative of the orientation of the system with respect to the at least one target; and
    an algorithm configured for enabling the processing unit to calculate the orientation of the system with respect to the at least one target based on the three ratios.

18. A system for tracking at least one object being illuminated by a laser designator, the system being configured for use in conjunction with an optical apparatus configured for receiving a light beam scattered by the at least one object in response to illumination from the laser designator, the system comprising:
  a detector having a sensing surface divided into exactly three sectors, each sector being adjacent to two sectors and all sectors meeting at a central point, the sensing surface of the detector being positioned with respect to the optical apparatus such that the light beam is projected by the optical apparatus onto the sensing surface as an unfocused spot, and each sector being configured for generating a respective signal indicative of an energy of a portion of the spot illuminating the sector;
  a data processing apparatus configured for receiving the signals from the detector, and processing the signals to determine an orientation of the system with respect to the at least one target;
  wherein the data processing apparatus comprises a processing unit and is associated with a non-volatile memory unit, wherein:
  the processing unit is configured for (i) receiving the signals from the sectors, (ii) determining a sum of the signals, (iii) determining exactly three ratios, each ratio corresponding to a respective sector and being calculated by dividing a signal from the respective sector by the sum of the signals, and (iv) determining the orientation of the system with respect to the at least one target based on the three ratios;
  the non-volatile memory unit is configured for storing at least one of:
    a look-up table wherein a set of the three ratios leads to a unique value indicative of the orientation of the system with respect to the at least one target; and an algorithm configured for enabling the processing unit to calculate the orientation of the system with respect to the at least one target based on the ratios.

19. A method for tracking at least one target being illuminated by a laser designator, the method comprising:
receiving signal outputs from sectors of a detector illuminated by a light beam scattered from the target in response to target being illuminated by the designator, the detector being divided into exactly three sectors, each sector being adjacent to two sectors and all sectors meeting at a common point, the signal outputs being indicative of respective energies of the portions of the light beam illuminating the respective sectors of the detector;
determining a sum of the signals;
determining a plurality of ratios, each ratio corresponding to a respective sector and being calculated by dividing a signal from the respective sector by the sum of the signals; and
determining the orientation of the system with respect to the at least one target based on the three ratios, via a look-up table and/or via one or more algorithms.

* * * * *